Jan. 18, 1938.  K. SCHRÖTER ET AL  2,105,553

CHASSIS OF VEHICLES

Filed Dec. 9, 1936

Inventors:
Kurt Schröter and
Hans O. Schröter
by Knight Bros
attorneys

Patented Jan. 18, 1938

2,105,553

UNITED STATES PATENT OFFICE 2,105,553

CHASSIS OF VEHICLES

Kurt Schröter and Hans O. Schröter, Wechmar, Gotha-Land, Germany

Application December 9, 1936, Serial No. 114,930
In Germany December 13, 1935

11 Claims. (Cl. 280—104)

The present invention relates to a vehicle chassis provided with means for compensating for uneven tracks of roads, for vehicles of all types, especially for motor driven or drawn vehicles and for vehicles drawn by animals.

According to the present invention, the vehicle axle assemblies are mounted to rock about an axis, which is disposed horizontally in the direction of travel, so as to be swingable in relation to the body supporting frame, and are connected to each other and to the body supporting frame by an intermediate member in such a manner that the body supporting frame, on rocking of the axle assemblies in relation to one another, is held in a position intermediate that of the axle assemblies. The intermediate member may be rotatable on a rail which forms a part of the body supporting frame and supports the frame superstructure and which connects the two axle assemblies.

The body supporting frame always takes up a middle position when the axle assemblies are rocked in relation to one another, and it is thereby possible to overcome the greatest obstacles in open country with relatively small upward swinging of the wheels in relation to the body supporting frame, without the wheels encountering the body supporting frame and without altering the wheel pressure of the individual wheels.

One construction of chassis according to the invention is shown by way of example in the accompanying drawing, in which—

Figure 1:
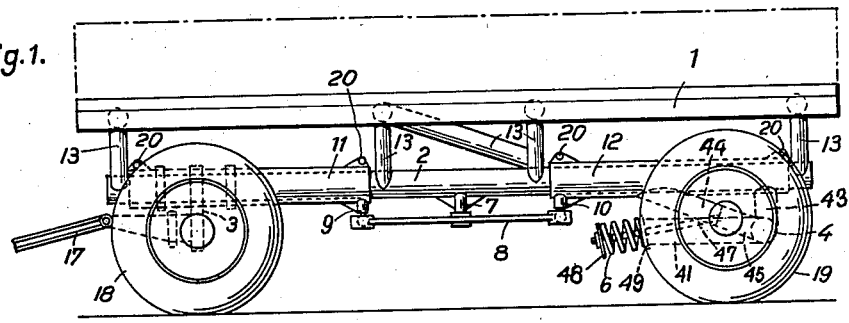
Figure 2:
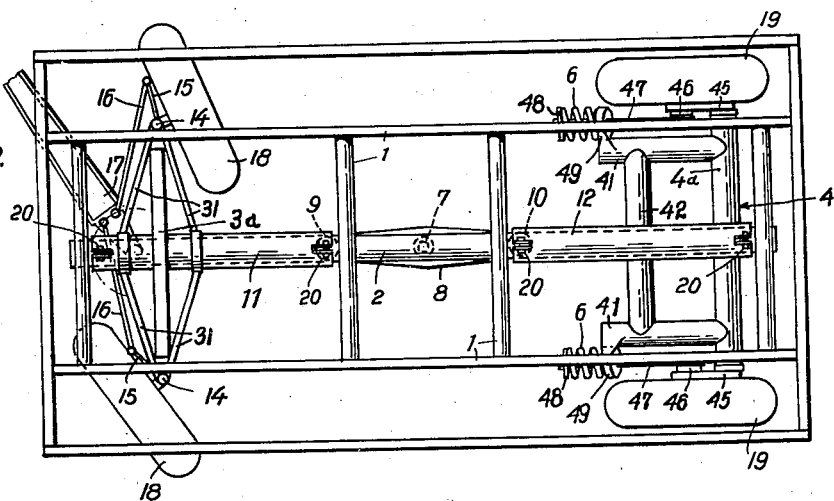
Figure 3:
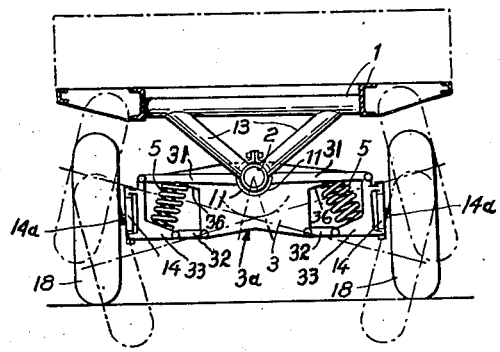

Figures 1, 2, and 3 are, respectively, a side elevation, a plan and a front elevation of the chassis.

The frame 1 is supported, through the intermediary of struts 13, on a central tubular supporting rail 2, forming a unit hereinafter referred to as the body supporting frame. The front axle assembly 3 and the rear axle assembly 4 are rockably mounted on the rail 2. The front axle assembly comprises an axle body 3a to which is fastened a tubular sleeve 11, steering knuckle yokes 33 connected by large links 31 to the sleeve 11 and by small links 32 to the axle body 3a, and steering knuckles 14 swiveled on the yokes 33 and provided with axles 14a for the front wheels 18. Each steering knuckle yoke 33 is supported against an overhang 3b of the axle body 3a by a spiral spring 5.

The rear axle frame comprises a tubular axle 4a provided with longitudinal struts 41 connected by a cross brace 42. The axle 4a is connected to a tubular sleeve 12 by struts 43, 44. In the axle 4a are mounted at each side crank shaped axle shafts 45 for the wheels 19. Tension rods 47 are hung upon the inward extensions 46 of the axle shafts 45. Upon these tension rods 47 are fastened spring plates 48, against which bear spiral springs 6, the opposite ends of which abut on lugs 49 of the longitudinal struts 41, so that the springs are compressed when the wheels 19 swing upward. Each of the four wheels 18 and 19 is therefore independently swung. A pin 7 is secured to the tubular supporting rail 2 and forms a pivot for a two-armed lever 8. The front axle assembly 3 and rear axle assembly 4 are connected to the lever 8 by the respective ball-joint pins 9 and 10. The sleeve 11 of the front axle assembly and the sleeve 12 of the rear axle assembly are slid onto the tubular supporting rail 2 before the front and rear struts 13 are attached to it, for example by screwing, so that the rail 2 is supported on the axle assemblies. The sleeves 11 and 12 are lined or coated at the bearing positions with a layer of fibre, asbestos or the like which is inserted so as to be capable of being compressed, so that any injurious play between the tubular supporting rail 2 and the sleeves 11 and 12 is thereby prevented and all noises are damped. Tightening of the sleeves 11 and 12 on the rail 2 enables a damping action to be effected by the fibre or intermediate layer so that if play occurs at the joint pins 9 and 10, or at the pivot pin 7, quiet working of the body supporting frame 1, 2, 13 is still ensured. The tightening of the sleeves 11 and 12 can be effected by slitting them at the ends at 20, and clamping them more or less tightly by screws or the like in the manner of hand-cuffs.

When travelling over obstacles, the front axle assembly 3 is rocked relatively to the rear axle assembly 4 or vice versa, as is indicated in Figure 3 by dot and dash lines, so that non-uniform spring or wheel loads would ordinarily arise. The compensating member 8 which is provided between the axle assemblies 3 and 4, however, ensures that all the wheels 18 and 19 are always subjected to equal wheel pressures, and that the tubular supporting rail 2 and the superstructure 1 fixed thereon are held in a central position in relation to both assemblies 3 and 4.

The steering knuckles 14 provide for turning movements of the front wheels 18 about a vertical axis. A linkage 15, 16 between each steering knuckle 14 and a pole 17 enables the direction of the front wheels to be controlled.

Instead of employing the described compensating means between the two axle assemblies, other devices, for example, toothed wheels, may be utilized without departing from the invention. Instead of a single lever 8 connecting the assemblies of the vehicle, several levers may be used.

We claim:—

1. In a vehicle chassis, a body supporting frame comprising a central longitudinal rail, a front axle assembly and a rear axle assembly each rockably mounted on said rail, and means connecting said axle assemblies with each other and with said frame in such a way that relative rocking of said axle assemblies positively moves said frame to a position intermediate that of said axle assemblies.

2. In a vehicle chassis, a body supporting frame comprising a central longitudinal rail, a front axle assembly and a rear axle assembly each rockably mounted on said rail, and a non-yielding lever system connecting said axle assemblies with each other and with said frame in such a way that relative rocking of said axle assemblies positively moves said frame to a position intermediate that of said axle assemblies.

3. In a vehicle chassis, a body supporting frame comprising a central longitudinal rail, a front axle assembly and a rear axle assembly each rockably mounted on said rail, and a single lever connected at its two ends to the respective axle assemblies and at its middle to said frame, whereby relative rocking of said axle assemblies brings said frame to a position intermediate that of said axle assemblies.

4. In a vehicle chassis, a body supporting frame comprising a central longitudinal tubular rail, a front axle assembly and a rear axle assembly each comprising a tubular sleeve adapted to mount the assembly rockably on said rail, and non-yielding means connecting said sleeves together and to said tubular rail in such a way that relative rocking of said axle assemblies turns said tubular rail to a position intermediate that of said axle assemblies.

5. In a vehicle chassis, a body supporting frame comprising a central longitudinal tubular rail, a front axle assembly and a rear axle assembly each comprising a tubular sleeve adapted to mount the assembly rockably on said rail, a lever and pins on said sleeves and said rail pivoted to said lever in such a way that relative rocking of said axle assemblies turns said tubular rail to a position intermediate that of said axle assemblies.

6. In a vehicle chassis, a body supporting frame comprising a central longitudinal tubular rail, a front axle assembly and a rear axle assembly each comprising a tubular sleeve adapted to mount the assembly rockably on said rail, a lever, pins on said sleeves, ball and socket connections between said pins and the ends of said lever, and means connecting said tubular rail to said lever in such a way that relative rocking of said axle assemblies turns said tubular rail to a position intermediate that of said axle assemblies.

7. In a vehicle chassis, a body supporting frame comprising a central longitudinal tubular rail, a front axle assembly and a rear axle assembly each comprising a tubular sleeve adapted to mount the assembly rockably on said rail, bushings between said tubular rail and said sleeves, and equalizing means connecting said sleeves to each other and to said tubular rail in such a way that relative rocking of said axle assemblies turns said tubular rail to a position intermediate that of said axle assemblies.

8. In a vehicle chassis, a body supporting frame comprising a central longitudinal tubular rail, a front axle assembly and a rear axle assembly each comprising a tubular sleeve adapted to mount the assembly rockably on said rail, bushings composed of fibrous material between said tubular rail and said sleeves, and equalizing means connecting said sleeves to each other and to said tubular rail in such a way that relative rocking of said axle assemblies turns said tubular rail to a position intermediate that of said axle assemblies.

9. In a vehicle chassis, a body supporting frame comprising a central longitudinal tubular rail, a front axle assembly and a rear axle assembly each comprising a tubular sleeve adapted to mount the assembly rockably on said rail, means for regulating the bearing pressure of said sleeves upon said tubular rail, and equalizing means connecting said sleeves to each other and to said tubular rail in such a way that relative rocking of said axle assemblies turns said tubular rail to a position intermediate that of said axle assemblies.

10. In a vehicle chassis, a body supporting frame comprising a central longitudinal tubular rail, a front axle assembly and a rear axle assembly each comprising a tubular sleeve adapted to mount the assembly rockably on said rail, equalizing means connecting said sleeves to each other and to said tubular rail in such a way that relative rocking of said axle assemblies turns said tubular rail to a position intermediate that of said axle assemblies, and ground wheels independently spring mounted on said axle assemblies.

11. In a vehicle chassis, a body supporting frame comprising a central longitudinal tubular rail, a front axle assembly and a rear axle assembly each comprising a tubular sleeve adapted to mount the assembly rockably on said rail, equalizing means connecting said sleeves to each other and to said tubular rail in such a way that relative rocking of said axle assemblies turns said tubular rail to a position intermediate that of said axle assemblies, said front axle assemblies comprising spring mounted steering knuckles, a pole, and a linkage connecting said pole with said steering knuckles.

KURT SCHRÖTER.
HANS O. SCHRÖTER.